US008068341B2

(12) United States Patent
Zhang et al.

(10) Patent No.: US 8,068,341 B2
(45) Date of Patent: Nov. 29, 2011

(54) ELECTRONIC DEVICE WITH EXPANSION CARD AND HOLDER

(75) Inventors: Ya-Ni Zhang, Shenzhen (CN); Wen-Hu Lu, Shenzhen (CN); Yi-Lung Chou, Taipei Hsien (TW); Li-Ping Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 112 days.

(21) Appl. No.: 12/719,817

(22) Filed: Mar. 8, 2010

(65) Prior Publication Data

US 2011/0096500 A1  Apr. 28, 2011

(30) Foreign Application Priority Data

Oct. 28, 2009 (CN) .......................... 2009 2 0313468

(51) Int. Cl.
*H05K 7/20* (2006.01)
*H05K 7/00* (2006.01)
(52) U.S. Cl. .................... 361/695; 361/679.49; 361/694; 454/184

(58) Field of Classification Search ............ 361/679.46–679.51, 694, 695; 454/184
See application file for complete search history.

(56) References Cited

U.S. PATENT DOCUMENTS

| 5,338,214 | A  | * | 8/1994 | Steffes et al. ................. 439/160 |
| 6,292,361 | B1 | * | 9/2001 | Johnson et al. .......... 361/679.54 |
| 2003/0016496 | A1 | * | 1/2003 | Kim et al. ..................... 361/695 |
| 2003/0043540 | A1 | * | 3/2003 | Chen et al. .................... 361/687 |
| 2008/0113297 | A1 | * | 5/2008 | Shibasaki et al. .......... 430/286.1 |
| 2008/0253076 | A1 | * | 10/2008 | Chen ............................. 361/684 |
| 2009/0262497 | A1 | * | 10/2009 | Beauchamp et al. .... 361/679.49 |
| 2011/0096489 | A1 | * | 4/2011 | Chou et al. .............. 361/679.32 |
| 2011/0096500 | A1 | * | 4/2011 | Zhang et al. ................. 361/695 |

* cited by examiner

*Primary Examiner* — Gregory Thompson
(74) *Attorney, Agent, or Firm* — Altis Law Group, Inc.

(57) ABSTRACT

An electronic device includes a chassis, a motherboard, an airflow duct, and an expansion card. The chassis includes a bottom wall, a rear wall, and a sidewall. A motherboard is disposed on the bottom wall, and a riser card perpendicularly connected to the motherboard. An expansion card is parallel to the motherboard and inserted in the riser card. The expansion card has a first end and a second end. The first end is secured to the rear wall of the chassis. An airflow duct is located on the bottom wall of the chassis. The airflow duct includes a mounting wall parallel to the chassis rear wall. The first end of the expansion card is secured to the rear wall, and the second end of the expansion card is mounted to the mounting wall of the airflow duct.

14 Claims, 5 Drawing Sheets

ELECTRONIC DEVICE WITH EXPANSION CARD AND HOLDER

BACKGROUND

1. Technical Field

The present disclosure relates to electronic devices, particularly, to an electronic device with an expansion card and holder.

2. Description of Related Art

For enhancing the capabilities of a computer system, they usually include expansion cards, such as sound cards, video cards, graphics cards etc. Conventionally, an expansion card is coupled to a riser card, and one end of the expansion card is secured to a rear wall of the computer system enclosure. However, some expansion cards have longer sizes. If the long expansion cards are secured to the computer enclosure in the conventional manner, it can be unstable. Therefore what is needed is an expansion card holder that will secure the longer expansion cards.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
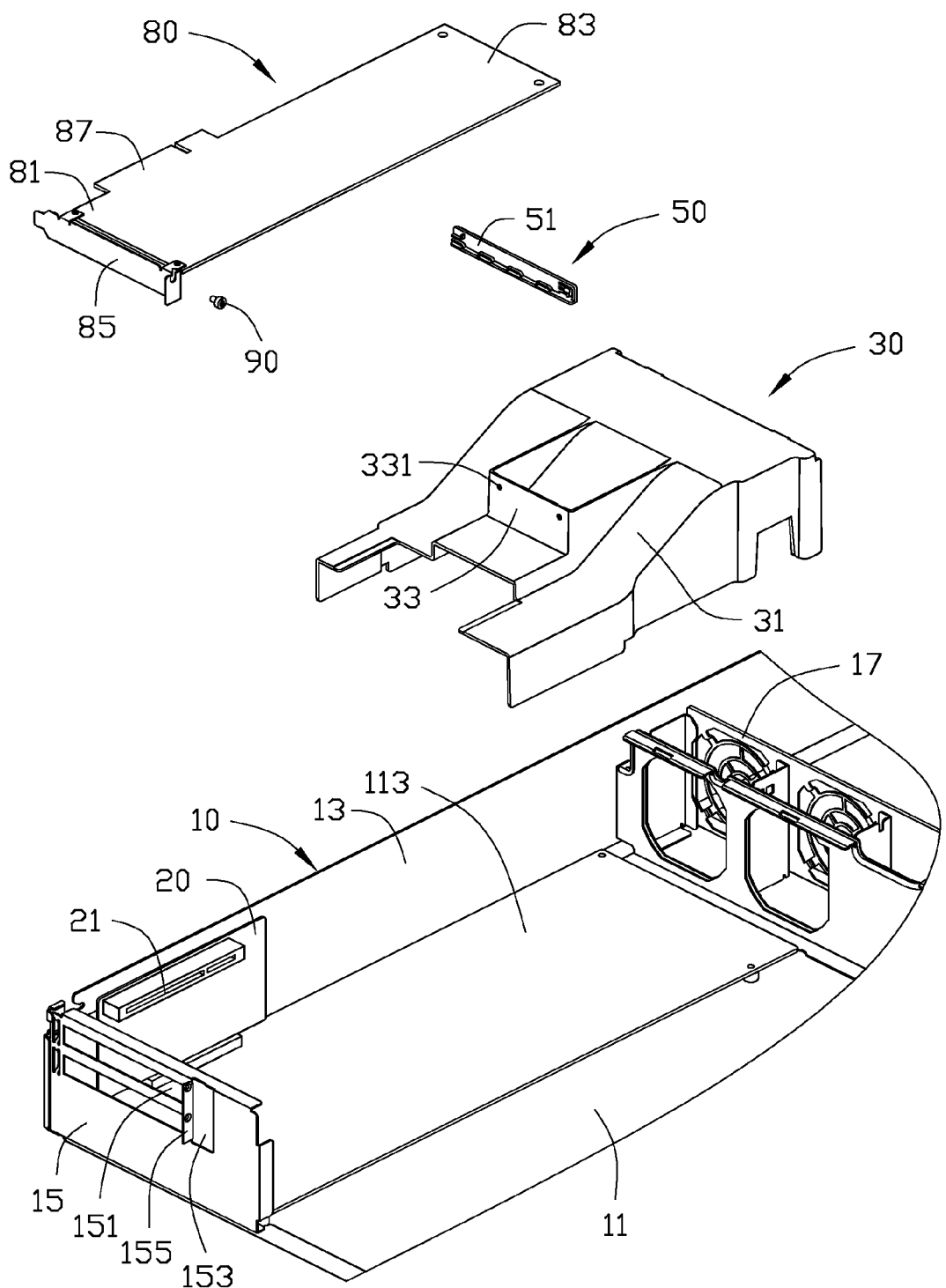
FIG. 1 is an exploded, isometric view of an electronic device in accordance with an embodiment.
Figure 2:
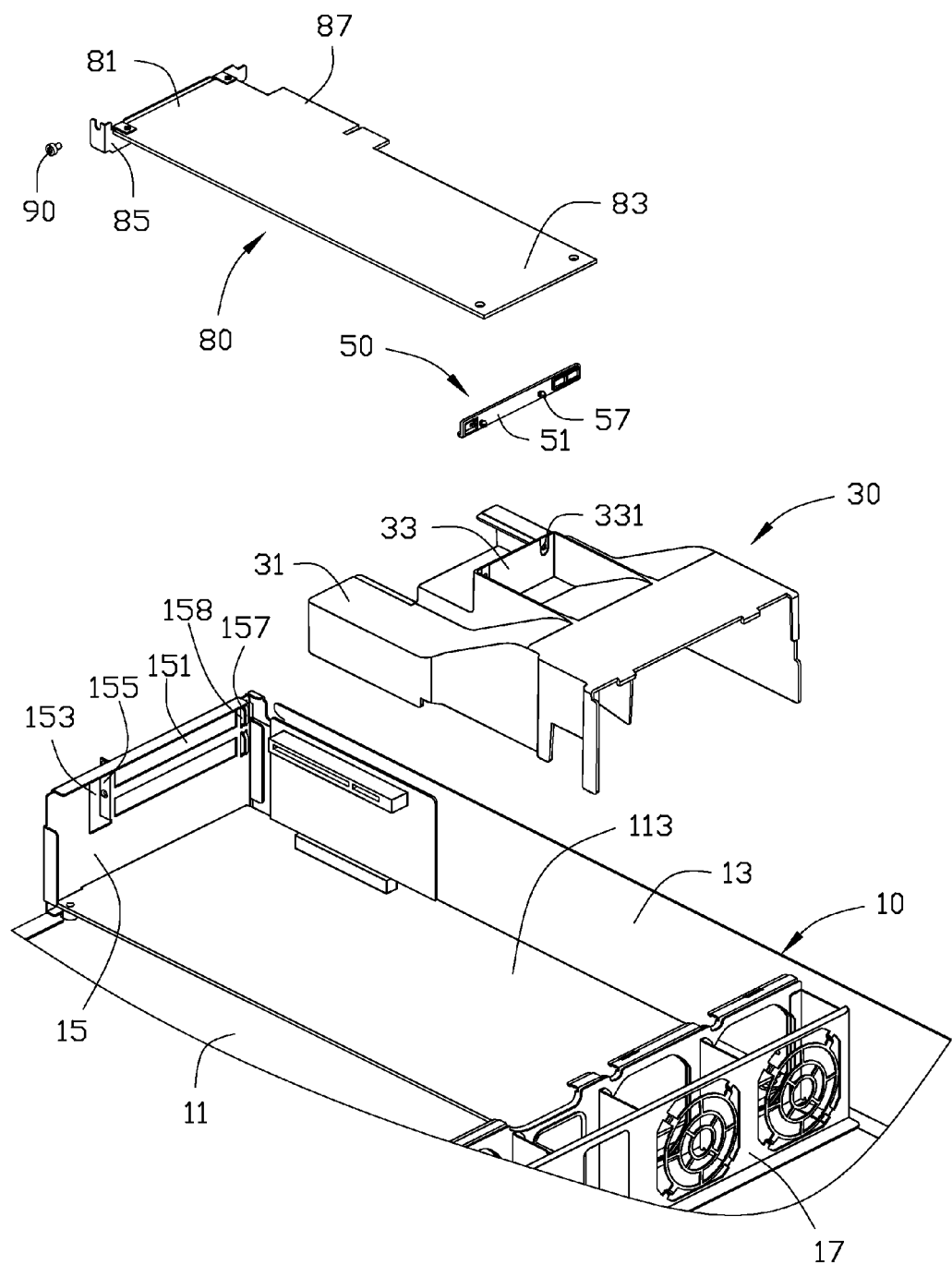
FIG. 2 is similar to FIG. 1, but viewed in another aspect.

Referring to FIGS. 1 and 2, an electronic device in accordance with one embodiment includes a chassis 10, an airflow duct 30 disposed in the chassis 10, an expansion card 80, and a securing member 50 configured to securely mount the expansion card 80 in the chassis 10. The expansion card 80 includes a first end 81, a second end 83 opposite to the first end 81, a fixing piece 85 secured to the first end 81, and a connecting portion 87.

The chassis 10 includes a bottom wall 11, a sidewall 13, and a rear wall 15 perpendicular to each other. A motherboard 113 is located in the bottom wall 11. A riser card 20 adjacent to the sidewall 13 is perpendicularly connected to the motherboard 113. A socket 21 is disposed at one side of the riser card 20. The rear wall 15 defines a plurality of expansion card slots 151. An opening 153 is defined adjacent to the expansion card slots 151. A mounting piece 155, extends from one side edge of the opening 153, and is configured to secure the fixing piece 83 of the expansion card 80. A bridge 157 is located on an inner side of the chassis rear wall 15, at one side, adjacent to the expansion card slots 151 and opposite to the opening 153. The bridge 157 defines a slot 158 configured for the fixing piece 85 to be inserted therein. A fan mounting bracket 17 is secured in the chassis bottom wall 11 which is opposite to the chassis rear wall 15. When in use, a plurality of fans (not shown) is accommodated in the fan mounting bracket 17. A plurality of fans will push cold air toward the chassis rear wall 15, to cool the electronic components, such as a CPU on the motherboard 113.

The airflow duct 30 includes top wall 31. A mounting wall 33, parallel to the chassis rear wall 15, extends up from the top wall 31. Two securing holes 331 are defined in the mounting wall 33. The airflow duct 30 is configured to guide the airflow generated by the fans towards the electronic components on the motherboard 113.

Figure 3:
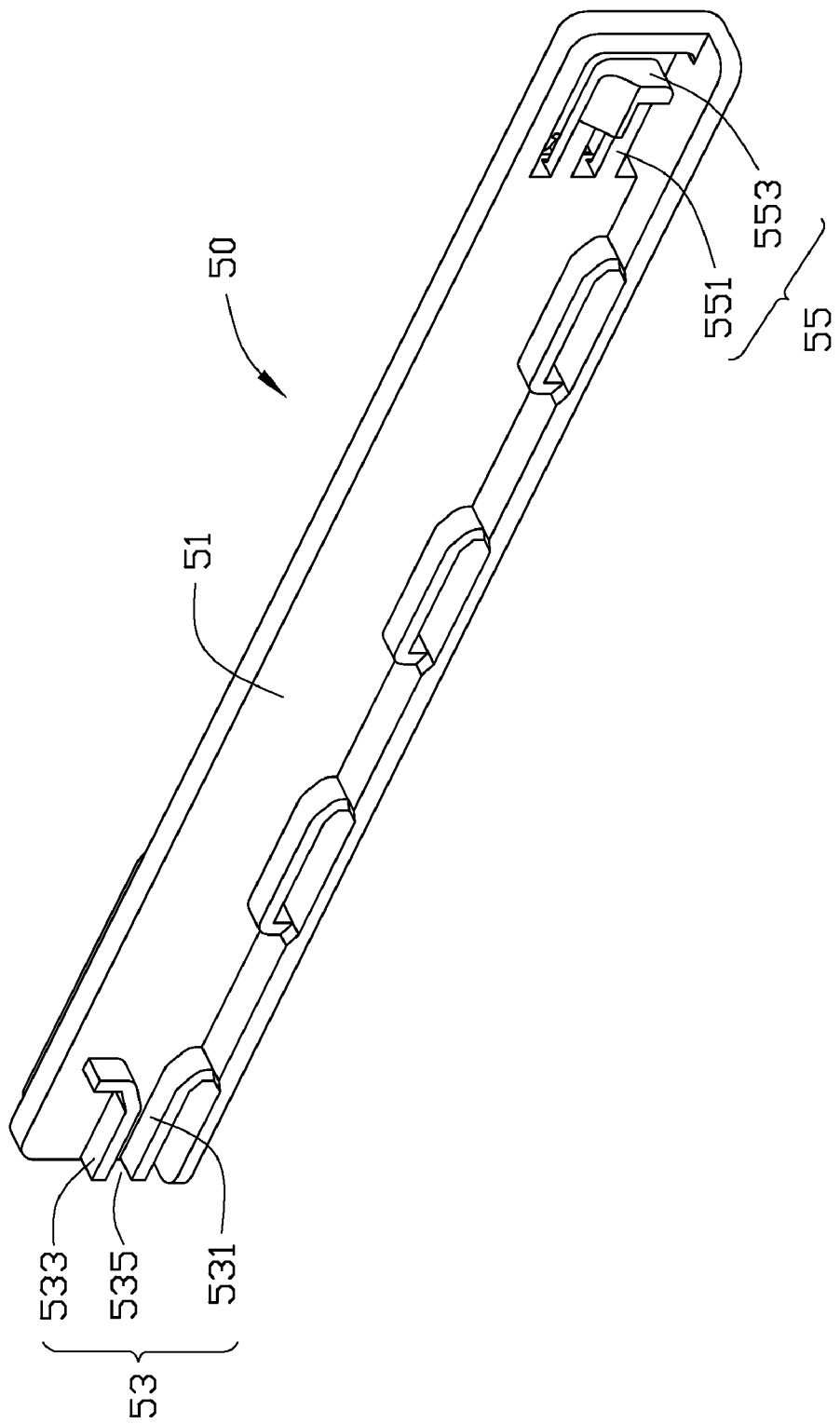
FIG. 3 is an exploded, isometric view of a securing member of FIG. 1.

Referring to FIG. 3, the securing member 50 includes a base 51. In one embodiment, the base 51 is rectangular shaped. Aligned in a straight line and protruding from the base 51 are pluralities of supporting portions 531. A limiting portion 533 is located above the supporting portions 531. The supporting portions 531 and the blocking portion 533 cooperatively define a receiving slot 535. The supporting portions 531, the blocking portion 533, and the receiving slot 535 cooperatively define a limiting means 53, which is configured to limit the movement of the expansion card 80 perpendicular to the bottom wall 11 of the chassis 13. An elastic blocking portion 55 is located on the base 51, and is configured to limit the movement of the expansion card 80 away from the rear wall 15 of the chassis 10. The elastic blocking portion 55 includes an elastic arm 551 and a blocking tab 553. Two securing posts 57 protrude from the base 51 and correspond to the securing holes 331 in the airflow duct 30. The limiting portion 533 is located at one side of the base 51 adjacent to the sidewall 13 of the chassis 10, and the elastic blocking portion 55 is located at one side of the base 51 away from the sidewall 13.

Figure 4:
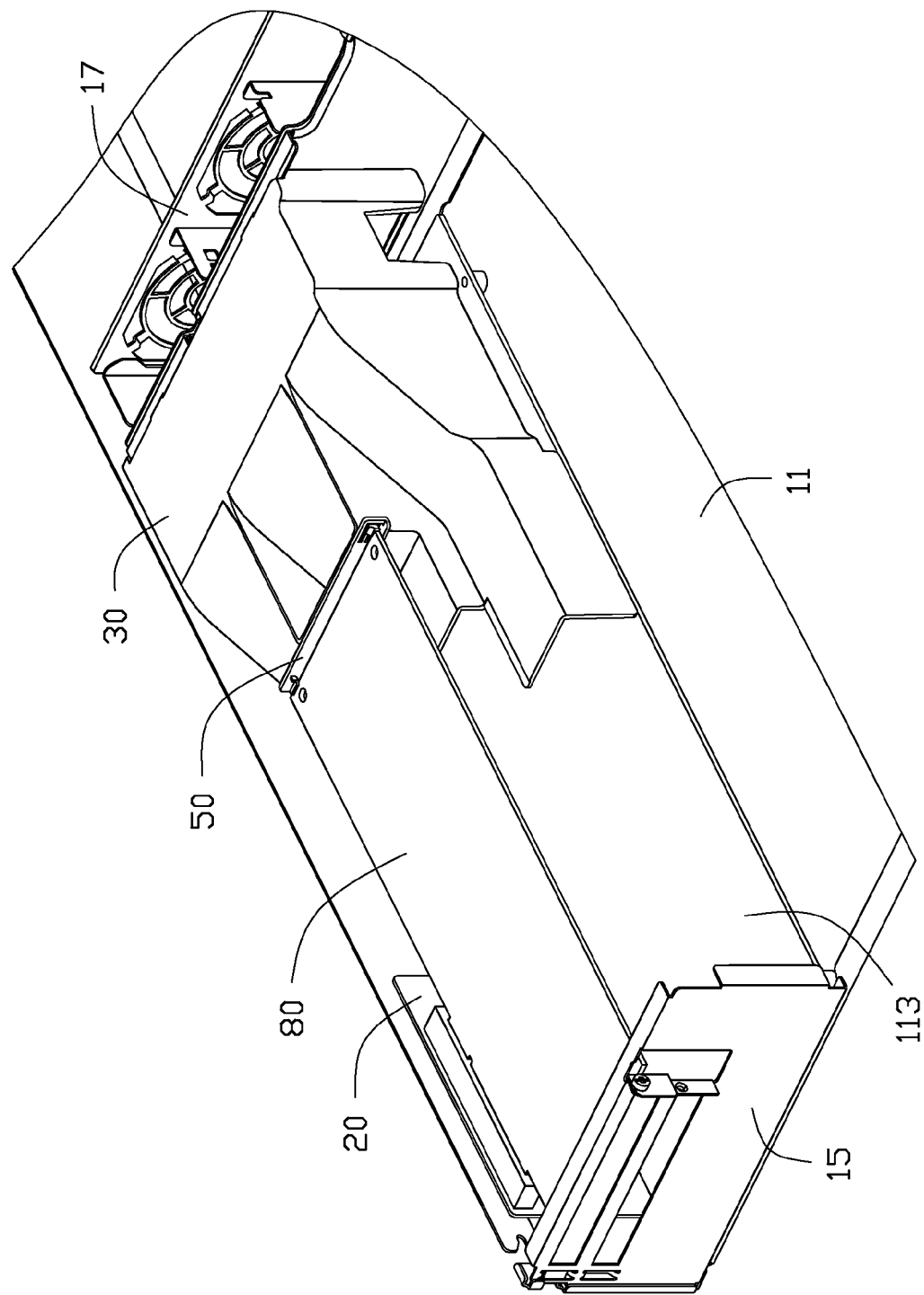
FIG. 4 is an assembled view of the fan assembly of FIG. 1.
Figure 5:
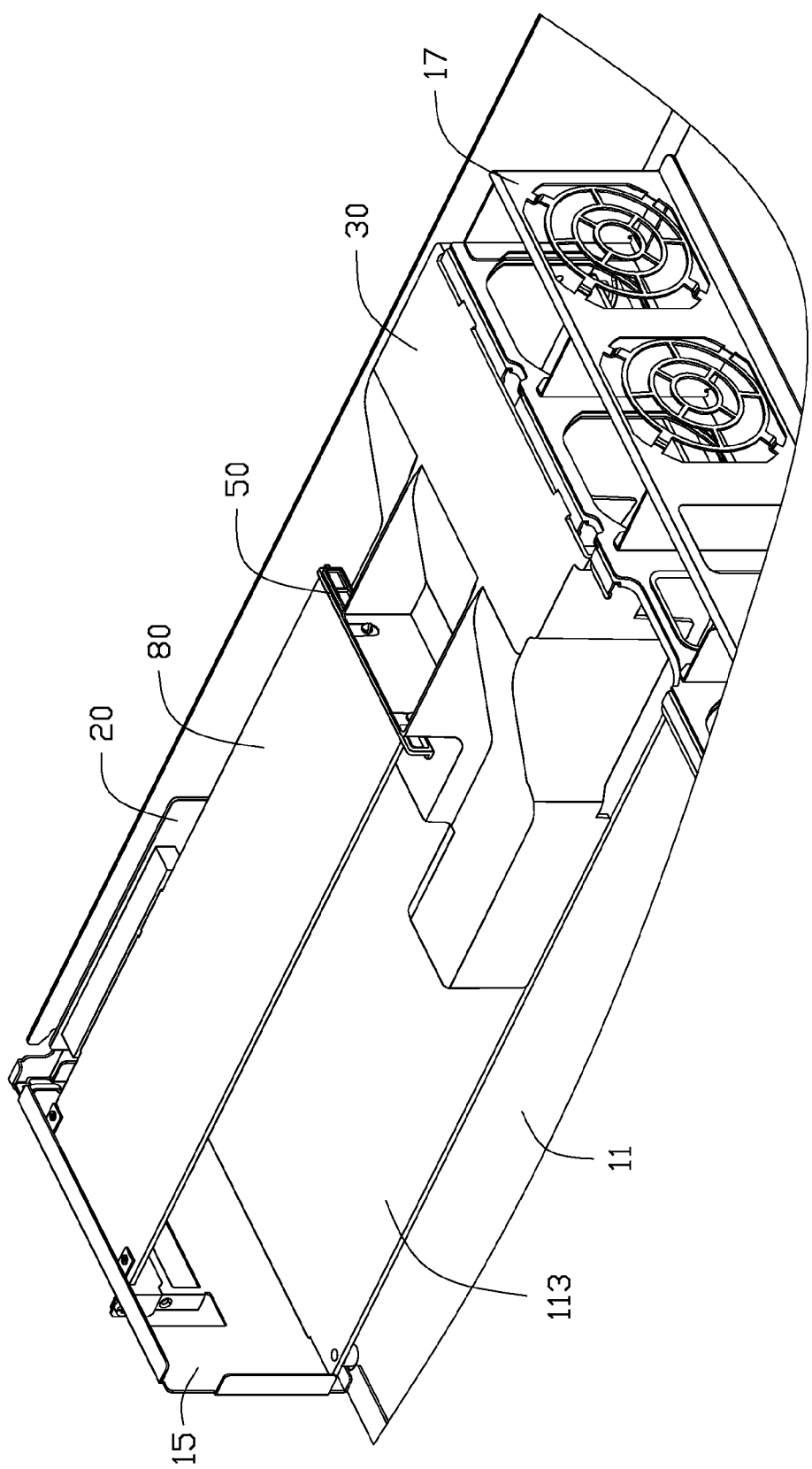
FIG. 5 is an assembled view of the fan assembly of FIG. 2.

Referring to FIGS. 4 and 5, in assembly, the airflow duct 30 abuts the fan mounting bracket 17 and is secured in the chassis 10. The airflow duct 30 guides cold air from the fans to flow towards the rear wall 15 of the chassis 10. The securing posts 57 of the securing members 50 engage in the securing holes 331 in the mounting wall 33 of the airflow duct 30.

When in assembly, the fixing piece 85 of the expansion card 80 is inserted in the slot 158 of the bridge 157. The expansion card 80 is moved towards the chassis sidewall 13, while the second end 83 of the expansion card 80 slides along the receiving slot 535 of the limiting space 53. The elastic blocking portion 55 of the securing member 50 is deformed toward the mounting wall 33 of the airflow duct 30. The elastic portion 55 rebounds to its original position, when the connecting portion 87 of the expansion card 80 is inserted in the socket 21 of the riser card 20. One side edge of the expansion card 80, away from the chassis sidewall 13, is blocked by the elastic blocking portion 55. The first end 81 of the expansion card 80, is coupled to one expansion card slot 151 in the chassis rear wall 15, and is secured to the chassis rear wall 15 via a fastener 90. The second end 83 of the expansion card 80, is limited by the limiting means 53 in a first direction, that is perpendicular to the chassis bottom wall 11, and is limited by the blocking portion 55, in a second direction away from the chassis sidewall 13. Thus, the expansion card 80, is secured in the chassis 10 and parallel to the motherboard 113 in the chassis 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An electronic device, comprising:
   a chassis having a bottom wall, a rear wall, and a sidewall;
   a motherboard disposed on the bottom wall, and a riser card perpendicularly connected to the motherboard;
   an expansion card parallel to the motherboard and inserted in the riser card, the expansion card having a first end and a second end, and the first end being secured to the rear wall;
   an airflow duct located on the bottom wall of the chassis; and
   a securing member mounted to the airflow duct, the securing member comprising a securing portion to accommodate the second end of the expansion card and limit a movement of the expansion card along a direction substantially perpendicular to the chassis bottom wall, and a blocking portion that prevents movement of the expansion card away from the riser card.

2. The electronic device of claim 1, wherein a fan mounting bracket is mounted on the bottom wall, and the airflow duct abuts the fan mounting bracket to conduct air flow toward the rear wall of the chassis.

3. The electronic device of claim 1, wherein the securing member comprises a base, the securing portion is located at one side of the base adjacent to the chassis sidewall, and the blocking portion is located at the other side of the base away from the chassis sidewall.

4. The electronic device of claim 3, wherein the securing portion comprises at least one supporting portion and a limiting portion, the supporting portion and the limiting portion cooperatively define a receiving slot, and the second end of the expansion card is accommodated in the receiving slot.

5. The electronic device of claim 3, wherein the blocking portion of the securing member comprises an elastic arm and a blocking protrusion, a side edge of the expansion card is blocked by the blocking protrusion.

6. The electronic device of claim 3, wherein the airflow duct comprises a mounting wall parallel to the chassis rear wall, and the securing member is secured to the mounting wall.

7. The electronic device of claim 6, wherein the base of the securing member abuts the mounting wall, and two securing posts protrude from the base and engage two securing holes in the mounting wall.

8. An electronic device, comprising:
   a chassis having a bottom wall, a rear wall, and a sidewall;
   a motherboard disposed on the bottom wall, and a riser card perpendicularly connected to the motherboard;
   an expansion card parallel to the motherboard and inserted in the riser card, the expansion card having a first end and a second end; and
   an airflow duct located on the bottom wall of the chassis, the airflow duct comprising a mounting wall parallel to the chassis rear wall, the first end of the expansion card being secured to the rear wall, and the second end of the expansion card being mounted to the mounting wall of the airflow duct.

9. The electronic device of claim 8, wherein a fan mounting bracket is mounted on the bottom wall, and the airflow duct abuts the fan mounting bracket to conduct air flow toward the rear wall of the chassis.

10. The electronic device of claim 8, wherein a securing member is mounted to the mounting wall of the airflow duct, the securing member comprising a securing portions to accommodate the second end of the expansion card and limit a movement of the expansion card along a direction perpendicular to the chassis bottom wall, and a blocking portion located on the securing member to prevent a movement of the expansion card along a direction away from the riser card.

11. The electronic device of claim 10, wherein the securing member comprises a base, the securing portions are located at one side of the base adjacent to the chassis sidewall, and the blocking portion is located at the other side of the base away from the chassis sidewall.

12. The electronic device of claim 10, wherein the securing portions comprises at least one supporting portion and a limiting portion, the supporting portion and the limiting portion cooperatively define a receiving slot, and the second end of the expansion card is accommodated in the receiving slot.

13. The electronic device of claim 10, wherein the blocking portion of the securing member comprises an elastic arm and a blocking protrusion, a side edge of the expansion card is blocked by the blocking protrusion.

14. The electronic device of claim 11, wherein the base of the securing member abuts the mounting wall, and two securing posts protrude from the base and engage two securing holes in the mounting wall.

* * * * *